May 16, 1967  KANESUKE IWASAKI  3,319,729
TORSION BALANCE WITH MAGNETS SUPPORTING DEAD LOAD
Filed Aug. 23, 1965  2 Sheets-Sheet 1
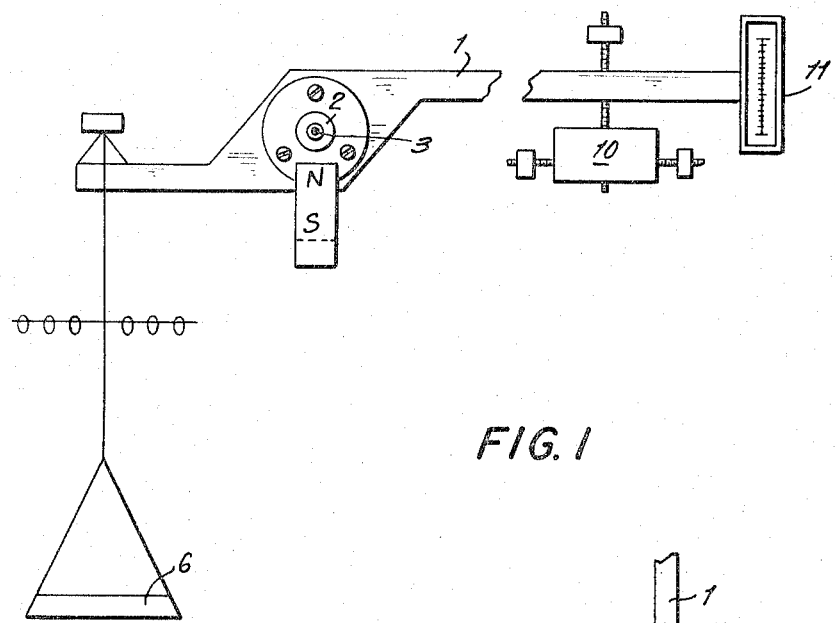
FIG. 1
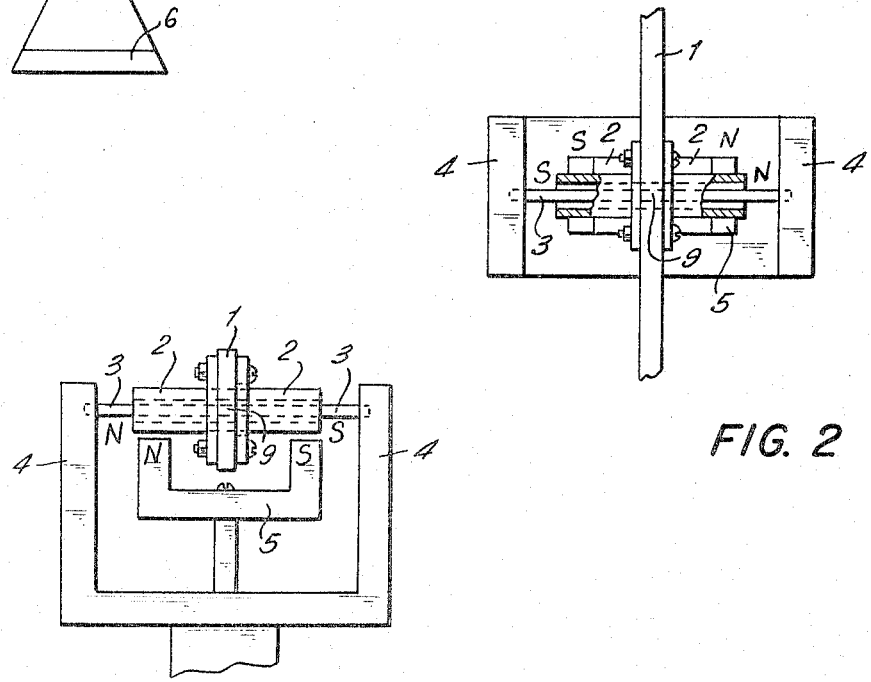
FIG. 2
FIG. 3
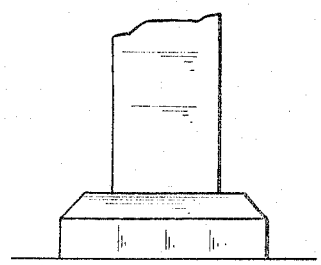
INVENTOR.
KANESUKE IWASAKI

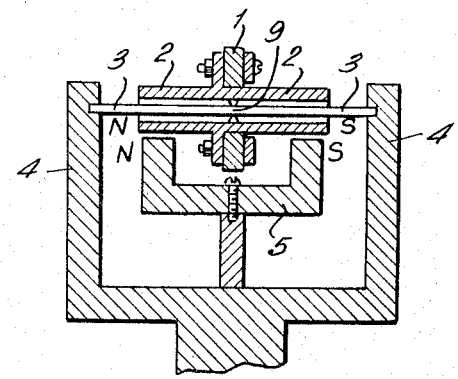
FIG. 4
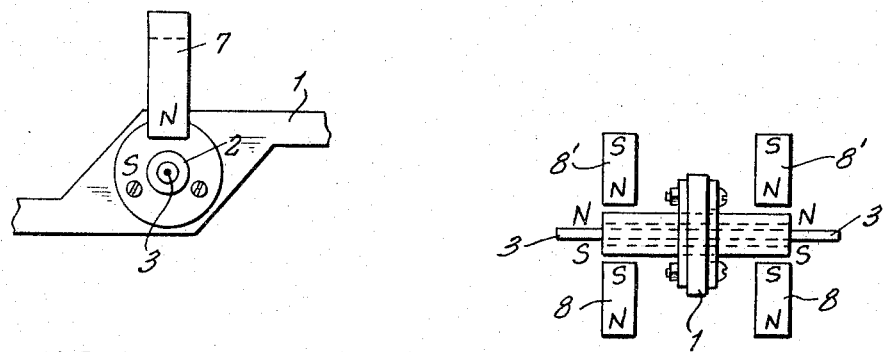
FIG. 5
FIG. 6

United States Patent Office 3,319,729
Patented May 16, 1967

3,319,729
TORSION BALANCE WITH MAGNETS
SUPPORTING DEAD LOAD
Kanesuke Iwasaki, Ichikawa, Chiba Prefecture, Japan,
assignor to Sankyo Company Limited, Tokyo, Japan
Filed Aug. 23, 1965, Ser. No. 481,810
5 Claims. (Cl. 177—225)

ABSTRACT OF THE DISCLOSURE

A torsion balance in which the dead weight of the device is counterbalanced by magnets. A cylindrical permanent magnet circumscribes a torsion bar which supports a balance beam. One or more additional permanent magnets reacts with the cylindrical magnet to support the weight of the beam structure.

---

In the accompanying drawings:

FIG. 1 is a front elevation of the essential parts of a repellent type torsion balance which is a typical embodiment of the present invention;

FIG. 2 is a plan view showing the arrangement of a torsion bar and the accessories thereof in the torsion balance of FIG. 1;

FIGS. 3 and 4 are side elevation and cross-sectional views, respectively, corresponding to FIG. 2, FIG. 5 is a front elevation of the essential parts of an attractive type torsion balance which is another embodiment of the invention; and FIG. 6 is a side elevation of the essential parts of a combined type torsion balance which is still another embodiment of the invention.

In the conventionally known torsion balance, a torsion bar suffers from direct impression of the weight of beam, pan and the like. This weight is a so-called dead load which makes the operable range of the balance undesirably narrow. Further, the torsion bar suffers from the loading due to torsion bending. Undesired bending load will be increased in proportion to the increase in weight to be measured. Thus, the length and thickness of a torsion bar are limited so as not to increase the bending load. On the other hand, the torsion bar should have increased length if improved sensitivity is desired. As apparently noted by those skilled in the art, however, this requirement is a quite contradication to the preceding requirement.

It is accordingly a principal object of the present invention to provide a torsion balance in simple and convenient form, said torsion balance having highly improved sensitivity without sacrificing its operable range. Other objects and advantages comprehended by the invention will be apparent from the description and claims which will follow.

In accordance with the present invention, there is provided a torsion balance which comprises a beam, a first magnet of substantially hollow cylindrical shape, affixed to said beam between its ends of preferably at the balance point of said torsion balance, the axis of said first magnet substantially perpendicular to said beam and substantially horizontal; a torsion bar placed so as to pass through said magnet in the mutually coaxial relation said torsion bar having its both ends fixed to the beam support of the balance; and a second magnet vertically above and/or below the said first magnet with an appropriative distance to compensate for the dead load of the torsion balance with the attractive or repulsive force between the first and second magnets.

Now my explanation will be given in detail with reference to the accompanying drawings.

In FIG. 1 to 4, the numeral 1 indicates a beam. At the balance paint of the torsion balance, a first magnet 2 of the hollow cylindrical shape is tightly fixed in the direction perpendicular to said beam. The magnet should be symmetrically placed in respect to the beam. Tight fixation of the first magnet to the beam may be made by close insertion of the magnet through the width of the beam as by shrink fitting. In a particular case, the first magnet is divided to two pieces, each of which are fixed to both sides of the beam by flange connections. Within the first magnet 2, a torsion bar 3 is placed in the mutually coaxial relation, said torsion bar usually being in the form of a tungsten wire or a quartz glass wire. At its both ends, this torsion bar is fixed on a beam support 4. The torsion bar is in close engagement with magnet 2 at its center point at which the torsion is transmitted to the bar. Close engagement of the torsion bar with magnet 2 can be made as by fixing the center part of the bar to the annular boss within the first magnet. As shown in FIG. 4, the torsion bar 3 is fixed to the annular boss 9 with a suitable adhesive. In some cases, a bolt which extends through the beam and first magnet to the torsion bar may be used. Below the first magnet 2, which is a permanent magnetic body, a second magnet is placed faced thereagainst with an appropriate aperture so as to provide a repellent force enough to compensate the dead load of the torsion balance system. In FIG. 1, the numeral 6, is a pan. There are also shown a balance weight 10 and scale 11.

In the above embodiment, it is noted that the first magnet 2 and the second magnet 5 are positioned in the mutually repelling relation. The magnet 5 may be a permanent magnet or an electro-magnet. The latter sometimes is preferable because it allows a fine adjustment to determine an appropriate repellent force by controlling the amount of electric current passing therethrough.

As apparent to those skilled in the art, the magnet 5 may be in the mutually attractive relation to the magnet 2 by suspending the former above the latter. Thus, FIG. 5 illustrates the essential parts of another embodiment of the present invention. In this embodiment, a first magnet 2 of the hollow cylindrical shape stands with a second magnet 7 in the mutually attractive relation. The second magnet 7 is suspended above the first magnet in such a manner that one of these magnets has its respective poles faced against the opposite poles of the other magnet.

FIG. 6 also illustrates the essential parts of a torsion balance which is still another embodiment of the present invention. In this embodiment, both the attractive and repelling forces between magnets are utilized to eliminate the dead load of a torsion balance. Practically, a first magnet 2 which is a permanent magnet of the hollow cylindrical shape is placed through a beam 1 and fixed thereto by means of flange connectors. A torsion bar 3 passes through the first magnet 2 and has its center part in close engagement therewith. There are provided two additional magnets, namely second and third magnets. The second magnet 8 comprises two parts of permanent magnets which are individually placed below the first magnet 2 to provide a repelling force, and the third magnet 8′ also comprises two parts of permanent magnets which are individually placed above the first magnet to provide an attractive force. As apparent from the drawing, the magnet 2 of FIG. 6 has the polarities distributed in its transverse direction, while the magnet 2 used in the embodiments of FIGS. 1 to 4 has the polarities distributed in its longitudinal direction. It will be understood that not only a hollow cylindrical material magnetized in its longitudinal direction but also that magnetized in its transverse direction can be used in a torsion balance of the present invention. A permanent magnet having the polarity distribution in the desired direction will be prepared by an appropriate magnetization method.

A torsion balance of the present invention, so being constructed as above, is entirely safe from undesired bending of a torsion bar due to the total weight of an operating mechanism including a beam, a pan and the like, since the said weight of the operating mechanism is substantially eliminated by the interaction between two magnets. The second advantage of this torsion balance is the remarkably increased weighable range and sensitivity because of its being free from torsion bending. Further, this torsion balance has a practical value because of its simple and convenient construction.

What I claim is:

1. A torsion balance comprising a beam, a first magnet of substantially hollow cylindrical shape affixed to said beam between its ends, the axis of said first magnet substantially perpendicular to said beam and substantially horizontal, a torsion bar coaxially within said first magnet and secured thereto, said bar having both its ends fixed to a beam support, a second magnet vertically spaced from said first magnet whereby the forces generated between said first and second magnets compensate for the dead load of said torsion balance.

2. A torsion balance according to claim 1 wherein said first magnet is affixed to said beam at the balance point of said torsion balance.

3. A torsion balance according to claim 1 wherein said second magnet is below the first magnet, said first and second magnets having their like poles juxtaposed, whereby a repelling force is generated.

4. A torsion balance according to claim 1 wherein said second magnet is above said first magnet, said first and second magnets having their opposite poles juxtaposed, whereby an attractive force is generated.

5. A torsion balance according to claim 3 wherein there is provided a third magnet above said first magnet, said first and third magnets having their opposite poles juxtaposed whereby an attractive force is also generated.

References Cited by the Examiner

UNITED STATES PATENTS

| 2,148,523 | 2/1939 | Baermann. |
| 2,357,891 | 9/1944 | Granberry. |
| 2,475,684 | 7/1949 | Weckerly. |

FOREIGN PATENTS

| 437,168 | 10/1935 | Great Britain. |

RICHARD B. WILKINSON, *Primary Examiner.*

ROBERT S. WARD, *Assistant Examiner.*